Patented June 14, 1938

2,120,560

UNITED STATES PATENT OFFICE 2,120,560

AZO DYESTUFFS AND THEIR PRODUCTION

Hans Krzikalla and Paul Garbsch, Ludwigshafen-on-the-Rhine, Germany, assignors to General Aniline Works, Inc., New York, N. Y., a corporation of Delaware No Drawing. Original application April 10, 1935, Serial No. 15,621. Divided and this application July 16, 1936, Serial No. 90,894. In Germany April 13, 1934

5 Claims. (Cl. 260—44.5)

The present invention relates to azo dyestuffs and a process of producing same. This application has been divided out from our copending application Ser. No. 15,621, filed April 10, 1935.

We have found that valuable azo dyestuffs are obtained by coupling aromatic diazoazo compounds which contain at least one sulfonic or carboxylic acid group with the addition compounds of alkylene oxides to aromatic primary or secondary amines capable of being coupled, which contain at least once attached to a nitrogen atom a hydroxyalkylether radicle of the general formula —(R—O)$_n$—R$_1$—OH in which R and R$_1$ are alkylene groups which may be substituted and $n$ is any whole number.

As aromatic primary or secondary amines suitable as initial materials in the production of our new dyestuffs there may be mentioned, monoethylaniline, monobutylcresidine, meta-toluidine, meta-chloraniline, meta-phenylenediamine, aniline and diphenylamine.

These dyestuffs are especially valuable for dyeing artificial silk and cotton. The greater the number of alkylene oxide radicles added to the aromatic primary or secondary amine the higher the dyeing power for cotton or viscose artificial silk. An increase in the number of alkylene oxide radicles also effects an increase in the capacity of dyeing through and in the levelling power, and an increase in solubility.

The following examples will further illustrate how the said invention may be carried out in practice but the invention is not restricted to these examples. The parts are by weight.

Example 1

1 molecular proportion of the diazotized disazo dyestuff (benzidine→acid H-acid←alkaline aniline) which has been rendered faintly alkaline is mixed with an aqueous solution of 1 molecular proportion of the addition compound from 8 molecules of ethylene oxide and meta-phenylenediamine. When the coupling is completed, the dyestuff is salted out. It dyes artificial silk (viscose or cuprammonium) blue to black shades and has a specially good levelling power and capacity for dyeing through.

The greater the number of ethylene oxide radicles attached to the meta-phenylenediamine, the higher the dyeing power for cotton or viscose artificial silk. An increase in the number of ethylene oxide radicles also effects an increase in the said capacity for dyeing through and in the levelling power, and increase in the solubility and a slight displacement of the shade of color towards green.

Instead of polyhydroxyethylated meta-phenylenediamine, the condensation product from polyglycerine chloride and meta-phenylenediamine, for example, may be employed as the coupling component.

A great variety of aminoazo dyestuffs may be employed as diazo components in a similar manner.

Example 2

The azo dyestuff, coupled on one side, prepared from tetrazotized toluidine and 2-naphthol-6-sulphonic acid is coupled in weakly alkaline solution with an aqueous solution of the addition compound of from 6 to 8 molecules of ethylene oxide and meta-phenylenediamine. After salting out, a disazo dyestuff is obtained which dyes cotton and viscose artificial silk violet shades which level very well.

The corresponding disazo dyestuff containing instead of 2-naphthol-6-sulphonic acid, salicylic acid or ortho-cresotic acid, yields reddish yellow to orange dyeings and the dyestuff prepared by employing 1-phenyl-5-pyrazolone-3-carboxylic acid yields red dyeings.

The dyestuffs obtainable according to this method of working are also distinguished by their great capacity for dyeing through.

What we claim is:—

1. The process of producing azo dyestuffs which comprises coupling aromatic diazoazo compounds which contain in their molecule at least one substituent selected from the group consisting of sulfonic and carboxylic acid groups with aromatic amines capable of being coupled and selected from the group consisting of primary and secondary amines which contain at least once attached to a nitrogen atom a hydroxyalkyl ether radicle of the general formula —(R—O)$_n$—R$_1$—OH in which R and R$_1$ stand for alkylene groups and $n$ for any whole number.

2. The azo dyestuff corresponding to the formula

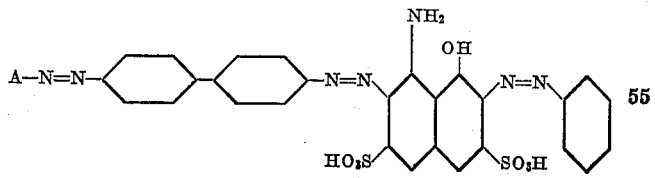

wherein A is the radicle of the addition compound of one molecular proportion of metaphenylene diamine with 8 molecular proportions of ethylene oxide.

3. The azo dyestuff corresponding to the formula

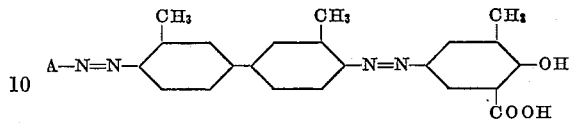

wherein A is the radicle of the addition compound of one molecular proportion of metaphenylene diamine with 8 molecular proportions of ethylene oxide.

4. The azo dyestuff ocrresponding to the formula

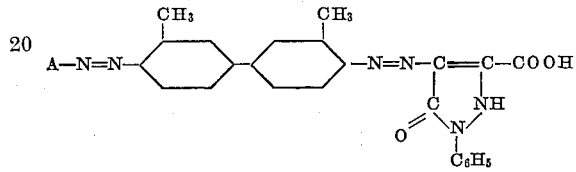

wherein A is the radicle of the addition compound of one molecular proportion of metaphenylene diamine with 8 molecular proportions of ethylene oxide.

5. The azo dyestuffs of the general formula

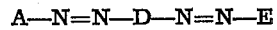

wherein A is the radicle of the addition compound of one molecular proportion of metaphenylene diamine with at least 5 molecular proportions of ethylene oxide, D is a diphenyl radicle and E is the radicle of a cyclic coupling component containing at least one substituent selected from the group consisting of sulfonic and carboxylic acid groups.

HANS KRZIKALLA.
PAUL GARBSCH.